3,141,037
PREPARATION OF FUMARIC ACID BY CATALYTICALLY ISOMERIZING MALEIC ACID PRODUCED BY THE OXIDATION OF BUTENE-2

Harry Olenberg, Bronx, and Joseph L. Russell, Ridgewood, N.Y., and Mitchell Becker, Teaneck, N.J., assignors to Halcon International, Inc., a corporation of Delaware
No Drawing. Filed Mar. 3, 1961, Ser. No. 93,029
3 Claims. (Cl. 260—533)

This invention relates to a method for pre-treating a crude maleic acid solution obtained from a conventional hydrocarbon-air oxidation so as to remove impurities and make it suitable for use in fumaric acid production, and more particularly, to making a de-gassed and preferably pre-oxidized maleic acid solution and its conversion to fumaric acid.

The preparation of maleic anhydride and maleic acid by the catalytic partial oxidation of suitable hydrocarbons is well known and has achieved considerable success commercially. Generally, such processes employ vanadia or vanadia and molybdena material as a catalyst, and this may be supported on a carrier. The crude anhydride effluent is absorbed in water and converted to the acid. The acid solution contains impurities, at least some of which are colored, and at least some of which interfere with its conversion to fumaric acid, particularly if the feedstock hydrocarbon is butene-2.

The standard used to indicate the quantity or intensity of color of the products in solution or liquid form is known as the APHA standard color test. This test is one developed by the American Public Health Association which uses the Hazen Platinum Cobalt Scale, a description of which is found on page 2048 of the 5th edition of "Standard Method of Chemical Analysis" by Wilford W. Scott.

For the colored feedstock which may be too hard to fit in the above mentioned scale, the standard used to indicate the quantity or intensity of color contained in the liquids is that known as the Gardner Color Standard (1933). This is the official color system of the paint and varnish industry and a description thereof is found on page 69 of "Physical and Chemical Examination of Paints, Varnishes, Lacquers and Colors," 9th ed. 1939, Institute of Paint and Varnish Research, Washington, D.C. by Henry A. Gardner.

The art is confronted by the problem of providing an economical and convenient method for converting butene-2 and the like hydrocarbons to fumaric acid.

The discoveries associated with the invention and relating to the solution of the above problems, and the objects achieved in accordance with the invention as set forth herein include the provision of:

The process for converting a hydrocarbon (oxidizable to maleic anhydride) to fumaric acid which includes catalytically oxidizing it with oxygen to make maleic anhydride, absorbing the anhydride in water to form aqueous maleic acid solution degassing the solution, (with or without pre-oxidizing), contacting it with an adsorbent and separating an effluent, catalytically isomerizing the maleic acid in this effluent to fumaric acid, and separating the resulting solid fumaric acid;

Such processes wherein the degassing is by air-blowing until the off-gas is substantially free of any aldehyde;

Such processes wherein the degassing is followed by treatment with 1 to 5% of any oxidizing agent, based on the weight of maleic acid;

Such processes wherein the adsorbent is in a series of zones, the first containing active carbon, the second cation exchange resin (acid form), and the third active carbon;

Such processes wherein the catalyst is ammonium bromide plus ammonium persulfate;

And other objects which will be apparent as details or embodiments of the invention are set forth hereinafter.

In order to indicate still more fully the nature of the present invention, the following examples of typical procedures are set forth in which parts and percent mean part and percent by weight, respectively, unless otherwise indicated, it being understood that these examples are presented as illustrative only and are not intended to limit the scope of the invention.

Example 1

A mixture of air and butene-2 is reacted in a maleic anhydride system. The reaction product is absorbed in water or aqueous liquor and the maleic anhydride in the reaction product is converted to maleic acid. The liquor is blown with air for about 2 hours at about 80° to 85° C. using 100 volumes of air per volume of liquor per hour. Then it is treated at the same temperature with 2% by weight of $NaClO_3$ based on the weight of the acid. The treated liquor is passed slowly through a 26 inch long, $5/16$ inch I.D. decolorizing column packed with activated carbon, using one pound of the carbon for an amount of liquor containing about 10.5 lbs. of maleic acid. The color of the column effluent is equal to about 1 on the Gardner scale.

The maleic acid content of 175.8 grams of this discolorized liquor (43.8% acid) is isomerized at about 75° to 80° C. in an agitated flask using 0.75 wt. percent $NH_4Br$ and 2.70 wt. percent $(NH_4)_2S_2O_8$, based on the acid, as catalyst. After about 30 minutes, the reaction mass is cooled to 24° C. and filtered, and 28.8 grams of fumaric acid is recovered, which is equal to 37.6% of theoretical conversion of maleic acid to fumaric acid.

Comparative Example A

Following the above procedure except avoiding the air-blowing, the untreated liquor is of comparable color. However, only about 23.8% of theoretical conversion of maleic acid to fumaric acid is obtained.

Example 2

The procedure of Example 1 is repeated except that the air-blowing is for 6 hours. This is followed by the chemical treatment and the amount of the decolorization carbon is one pound for an amount of liquor containing 20 lbs. of maleic acid. The color of the treated liquor is 150 to 200 on the APHA scale. An 82% conversion of maleic acid to fumaric acid is obtained.

Comparative Example B

Following the Example 2 procedure except using no air-blowing, and as the chemical treatment, using 3.5 wt. percent of $HNO_3$ at the boil for 10 minutes, only about 34% conversion is obtained.

It is noteworthy that the procedures of Examples 1 and 2 give much higher yields, whereas the comparative examples give a relatively low yield, under similar chemical treatment and isomerization conditions. This clearly demonstrates the criticality of the air-blowing treatment. The combination of the air-blowing with the mild chemical oxidan treatment gives superior results.

Example 3

The procedure of Example 2 is repeated except that the decolorizing column contains:

1st 12 ins.—activated carbon (e.g. OL grade, from Pittsburgh Coke & Chemical Co.)
2nd 12 ins.—cation exchange resin (acid form) (e.g. Dowex 50 W8X H+type; from Dow Chemical Co.)
3rd 12 ins.—activated carbon Similar results are obtained.

The procedures of the examples are repeated except that the decolorization column contains alumina, silica gel or diatomaceous earth, and similar results are obtained.

Example 4

The procedure of Example 3 is repeated except first air-blowing for 3 hours, then treating with 1% of $NaClO_3$, and then 3 more hours of air-blowing, all at 80° to 85° C. An about 71% of theoretical conversion of maleic acid to fumaric acid is obtained. A 5% solution of the product in methanol has an APHA color of 10.

Comparable results to the foregoing are obtained with the following modifications. Instead of blowing with air, an inert gas may be used. If desired, the liquor may be degassed or stripped of lower boiling materials by removing them at reduced pressure. A convenient test of the treatment is that the liquor be substantially free of low-boiling aldehydes. The treatment may be terminated if the exit gas no longer carries any such aldehyde or the like odor.

Including gaseous oxygen in the blowing gas helps in overcoming the undesirable effects of oxidizable impurities or contaminants. The treatment with a chemical oxidant such as sodium chlorate lowers the load on the adsorbent, so that much more liquor may be treated and clarified with a given amount of adsorbent.

The air-blowing may be at a rate in the range of 1 to 5,000, desirably 50 to 2,000, and preferably 100 to 1,000 volumes of air per volume of liquid per hour. The air-blowing temperature is in the range of about 30° to 95° C. preferably about 80° to 85° C.

It is desirable that the effluent or filtrate from the treatment with an adsorbent be substantially free of low-boiling aldehydes, and the blowing is controlled to achieve this. Instead of blowing, equivalent degassing methods may be used, e.g. vacuum stripping, or controlled partial distillation.

About 1 to 5% of a chemical oxidant may be used, e.g. chlorate, peroxide, and the like.

A solid adsorbent may be used for selectively removing impurities or color bodies as already shown in the examples, and the treatment may be by passing the liquid through the adsorbent while the latter is in stationary form or mixing the adsorbent with the liquid and then separating the treated liquor therefrom, and the like. Generally, per part by weight of adsorbent, 1 to 300 parts or liquor may be treated, desirably 50 to 200, and preferably about 75 to 125. The temperature of treatment of the adsorbent is preferably room temperature, although higher or lower temperatures may be used as long as maleic acid remains dissolved in the liquor; generally this is at an upper concentration of about 40% maleic acid at room temperature. Other concentrations may be used in a range of about 15 to 70, desirably 30 to 50 and preferably about 35 to 40 or somewhat above.

The preferred isomerization catalyst is ammonium bromide plus ammonium persulfate (as set forth more fully in the application Serial Number 46,053, filed July 29, 1960). However, other known active catalysts, such as thiourea and the like may be used if desired. The isomerization temperature is 40° to 130° C.

This invention provides a means of producing better maleic acid scrubber liquors and provides higher conversions and purer fumaric acid product than otherwise obtainable. It is applicable to air oxidation reaction products of benzene and of other hydrocarbon stocks used to make maleic anhydride and maleic acid.

It is indeed surprising that fumaric acid may be produced with such high output efficiencies in accordance with the invention, especially when one keeps in mind the many undesirable effects or side reactions that may occur during or simultaneously with the desired pre-oxidation and subsequent reactions.

In view of the foregoing disclosures, variations and modifications thereof will be apparent to one skilled in the art and it is intended to include within the invention all such variations and modifications except as do not come within the scope of the appended claims.

What is claimed is:

1. In a process for the preparation of fumaric acid having improved color properties by the isomerization of a solution of crude maleic acid obtained from the air oxidation of butene-2, the improvement of blowing from 50 to 2000 volumes of air per volume of solution per hour through said solution at a temperature of from 30 to 95° C. until the air exiting from the solution is substantially free of aldehydes so as to degas the solution prior to isomerization.

2. In the process of claim 1 wherein from 100 to 1000 volumes of air per volume of solution per hour are employed and the temperature is in the range of from about 80 to 85° C.

3. The process of claim 1 wherein the isomerization catalyst is ammonium bromide and ammonium persulfate.

References Cited in the file of this patent

UNITED STATES PATENTS

| | | |
|---|---|---|
| 2,494,049 | Levin et al. | Jan. 10, 1950 |
| 2,638,481 | Nachod | May 12, 1953 |

OTHER REFERENCES

Dittmar: Journal Chemical Society (London), New Series, vol. VII, page 447 (1869).

Weissberger: "Technique of Organic Chemistry," vol. V, pages 188–199, Adsorption and Chromatography, 1951.

Groggins: "Unit Processes in Organic Synthesis," fifth edition, page 493 (1958).

UNITED STATES PATENT OFFICE
CERTIFICATE OF CORRECTION

Patent No. 3,141,037                July 14, 1964

Harry Olenberg et al.

It is hereby certified that error appears in the above numbered patent requiring correction and that the said Letters Patent should read as corrected below.

Column 3, line 55, strike out "The preferred isomerization catalyst is ammonium bro-" and insert instead -- The preferred adsorbent treatment is in a series of zones, --.

Signed and sealed this 1st day of December 1964.

(SEAL)
Attest:

ERNEST W. SWIDER                      EDWARD J. BRENNER
Attesting Officer                        Commissioner of Patents